United States Patent Office 3,337,540
Patented Aug. 22, 1967

3,337,540
METHINE DYES
Marcel Jan Libeer, Mortsel-Antwerp, Hendrik Adolf Pattijn, Wilrijk-Antwerp, and Jean Marie Nys, Mortsel-Antwerp, Belgium, assignors to Gevaert Photo-Producten N.V., Mortsel-Antwerp, Belgium, a Belgian company
No Drawing. Filed Apr. 10, 1963, Ser. No. 271,883
Claims priority, application Great Britain, Apr. 13, 1962, 14,381/62
9 Claims. (Cl. 260—240)

This invention relates to new dyes, their preparation and use as sensitizers for light-sensitive coatings.

We have found a new class of methine dyes containing at least one radical of one of the following structural formulae:

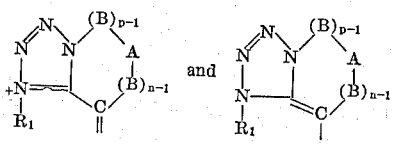

wherein:

$(B)_{n-1}$ represents in the case $n>1$ one or more equally or differently substituted and/or not substituted methylene groups $(B)_{p-1}$ represents in the case $p>1$ one or more equally or differently substituted and/or not substituted methylene groups each of $p$ and $n$ represents an integer of at least 1 but so that $3 < n+p \leq 5$ A represents a methylene group, a substituted methylene group, or a group

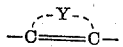

wherein Y represents the atoms necessary to close an aromatic or a substituted aromatic nucleus, and
$R_1$ represents a substituent of the type contained in cyanine dyes on the cyanine nitrogen atom, e.g. an alkyl or substituted alkyl group such as methyl, ethyl, propyl, isopropyl, butyl, isobutyl, an allyl group (vinyl methyl), β-hydroxyethyl group, β-acetoxyethyl group, sulphoethyl group, sulphopropyl group, sulphobutyl group, propylsulphate group, butylsulphate group, benzyl group (phenylmethyl), carboxymethyl group, carboxyethyl group, carboxybenzyl group, a group

wherein A and B have the same significance as set forth in the British patent specification 886,271 such as e.g. sulphocarbomethoxymethyl, ω-sulphocarbopropoxymethyl, ω-sulphocarbobutoxymethyl, p-(ω-sulphocarbobutoxy)-benzyl, the group —A'—W—NH—V—B' wherein A', W, V and B' have the same significance as set forth in the British patent specification 904,332 such as e.g. N-(methylsulphonyl)-carbamylmethyl, γ-(acetylsulphonamido)-propyl, δ-(acetylsulphonamido)-butyl, a group

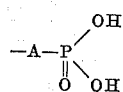

wherein A has the same significance as described in the British patent specification 886,270, an aryl radical such as phenyl, a carboxyphenyl group, a cycloalkyl radical such as cyclohexyl.

More particularly we provide symmetrical and asymmetrical new cyanine dye salts represented by the following general formulae:

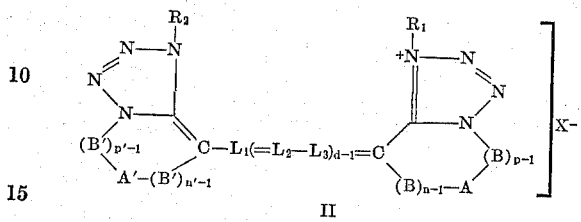

II wherein:

A, $(B)_{n-1}$ and $(B)_{p-1}$ have the same value as in the general structures I described above and A', $(B')_{n'-1}$ and $(B')_{p'-1}$ are respectively defined as A, $(B)_{n-1}$, $(B)_{p-1}$ but may have respectively either or not the same value as A, $(B)_{n-1}$ or $(B)_{p-1}$, $R_1$ has the same significance as described above, $R_2$ has the same significance as described for $R_1$, each of $L_1$, $L_2$ and $L_3$ represents a methine group or a substituted methine group (e.g. =CH—, =C.CH$_3$—, =C.C$_2$H$_5$—, =C.C$_3$H$_7$—, =C.CH$_2$C$_6$H$_5$—, =C.O—alkyl—

=C.S—alkyl, =C.Se—alkyl—, =C.O—acyl—,

=C.COO—C$_2$H$_5$—

=C.NHR'—, =C.NHCOR—, =C.CONHR— (wherein R and R' are hydrogen, alkyl or aryl), =C.(CH=)$_r$D— (wherein D represents a heterocyclic radical, and $r$ represents zero or a positive integer from 1 to 6), or a methine group which forms part of a heterocyclic or isocyclic ring such as for example a cyclopentadiene ring;

$d$ represents a positive integer from 1 to 3;

$X^-$ represents an acid radical of the type used in cyanine dyes such as chloride, bromide, iodide, perchlorate, benzene sulphonate, p-tolusulphonate, methylsulphate, ethylsulphate, propylsulphate or the like.

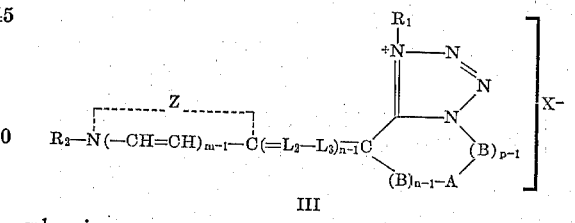

III wherein:

A, $(B)_{n-1}$, $(B)_{p-1}$ have the same value as described in Formula I, $L_2$, $L_3$ and $R_1$, $R_2$ and $X^-$ have the same value as described in Formula II, $r$ represents a positive integer from 1 to 4, $m$ represents a positive integer from 1 to 2, Z represents the atoms necessary to complete a 5-membered or 6-membered heterocyclic nitrogen nucleus of the type contained in cyanine dyes such as those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6-dioxymethylenebenzothiazole, 5 - hydroxybenzothiazole, 6 - hydroxybenzothiazole, 5,6 - dimethylbenzothiazole), those of the naphthothiazole series (e.g. naphtho[2,1-d]thiazole, naphtho[1,2-d]thiazole, 5-methoxynaphtho[1,2-d]thiazole, 5-ethoxynaphtho[1,2-d]thiazole, 8-methoxynaphtho[2,1-d]thiazole, 7 - methoxynaphtho[2,1-d]thiazole), those of the thionaphtheno[7',6'-d]thiazole series (e.g. 4'-methoxythionaphtheno[7',6'-d]thiazole), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 6-methoxybenzoxazole, 5-hydroxybenzoxazole, 6 - hydroxybenzoxazole), those of the naphthoxazole series (e.g. naphtho[2,1-d]oxazole, naphtho[1,2-d]oxazole), those of the selenazole series (e.g. 4-methylselenazole, 4-phenylselenazole), those of the benzoselenazole series (e.g. benzoselenazole, 5-chlorobenzoselenazole, 5-methoxybenzoselenazole, 5-hydroxybenzoselenazole, 4,5,6,7-tetrahydrobenzoselenazole), those of the naphthoselenazole series (e.g. naphtho[2,1-d]selenazole, naphtho[1,2-d]selenazole), those of the thiazoline series (e.g. thiazoline, 4-methylthiazoline, 4-hydroxymethyl-4-methylthiazoline, 4,4-bis-hydroxymethylthiazoline, 4-acetoxymethyl-4-methylthiazoline, 4,4-bis-acetoxymethylthiazoline), those of the thiazolidine series (e.g. 5-(2-benzothiazolylidene)-4-thiazolidone), those of the oxazoline series (e.g. oxazoline, 4-hydroxymethyl-4-methyloxazoline, 4,4 - bis-hydroxymethyloxazoline, 4-acetoxymethyl-4-methyloxazoline, 4,4-bis-acetoxymethyloxazoline), those of the oxazolidine series, those of the selenazoline series (e.g. selenazoline), those of the 2-quinoline series (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline etc.), those of the 4-quinoline series (e.g. quinoline, 6-methoxyquinoline, 7-methylquinoline, 8-methylquinoline), those of the 1-isoquinoline series (e.g. isoquinoline 3,4-dihydroisoquinoline), those of the 3-isoquinoline series (e.g. isoquinoline), those of the 3,3-dialkylindolenine series (e.g. 3,3-dimethylindolenine, 3,3,5-trimethylindolenine, 3,3,7-trimethylindolenine), those of the pyridine series (e.g. pyridine, 5-methylpyridine), those of the benzimidazole series (e.g. 1-ethylbenzimidazole, 1-phenylbenzimidazole, 1-ethyl-5,6-dichlorobenzimidazole, 1 - hydroxyethyl - 5,6-dichlorobenzimidazole, 1-ethyl-5-chlorobenzimidazole, 1-ethyl-5,6-dibromobenzimidazole, 1 - ethyl-5-chloro-6-aminobenzimidazole, 1-ethyl-5-chloro-6-bromobenzimidazole, 1-ethyl-5-phenylbenzimidazole, 1-ethyl-5-fluorobenzimidazole, 1-ethyl-5-cyanobenzimidazole, 1-($\beta$-acetoxyethyl)-5-cyanobenzimidazole, 1-ethyl-5 - chloro - 6-cyanobenzimidazole, 1 - ethyl-5-fluoro-6-cyanobenzimidazole, 1-ethyl-5-acetylbenzimidazole, 1-ethyl-5-chloro-6-fluorobenzimidazole, 1-ethyl-5-carboxybenzimidazole, 1-ethyl-7-carboxybenzimidazole, 1 - ethyl-5-carbethoxybenzimidazole, 1-ethyl-7-carbethoxybenzimidazole, 1-ethyl-5-sulphonamidobenzimidazole, 1-ethyl-5-N-ethylsulphonamidobenzimidazole).

We also provide asymmetrical mono-, tri- and pentamethino dye salts containing in the same molecule a tetrazole nucleus of Formula I and a 1,2-cyclomethylene benzimidazole nucleus represented by the Formulae I or II of the Belgian patent specification 618,235.

Further we provide new merocyanine dyes represented by the following general formula:

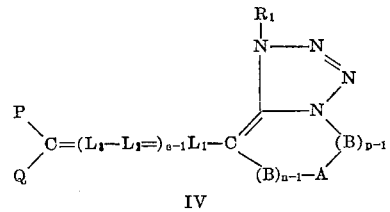

IV wherein:

A, $(B)_{n-1}$, $(B)_{p-1}$ have the same value as in the general structure I, and $R_1$, $L_1$, $L_2$ and $L_3$ have the same value as in Formula II, $e$ represents a positive integer from 1 to 2, P and Q each represent an organic group, at least one of these groups being an electronegative group such as —CN or —COOR$_3$ groups, wherein $R_3$ represents an hydrogen atom or an alkyl radical such as methyl or ethyl, e.g. an alkyl radical of the formula $C_wH_{2w+1}$ wherein $w$ represents an integer from 1 to 4; the radical

may also represent a nucleus with negative character such as those of the pyrazolone series (e.g. 3-methyl 1-phenyl-5-pyrazolone, 1-phenyl - 5 - pyrazolone, 1 - (2-benzothiazolyl)-3-methyl-5-pyrazolone, etc.), those of the isoxazolone series (e.g. 3-phenyl-5(4H)-isoxazolone, 3-methyl-5(4H)-isoxazolone, etc.), those of the oxindole series (e.g. 1-alkyloxindoles etc.), those of the 2,4,6-tri-ketohexahydropyrimidine series (e.g. barbituric acid or 2-thiobarbituric acid as well as their 1-alkyl derivatives (e.g. 1-methyl, 1-ethyl, 1-n-propyl, 1-n-heptyl, etc.), their 1,3-dialkyl derivatives (e.g. 1,3-dimethyl, 1,3-diethyl, 1,3-di-n-propyl, 1,3-diisopropyl, 1,3-dicyclohexyl, 1,3-di-($\beta$-methoxyethyl), their 1,3-diaryl derivatives (e.g. 1,3-diphenyl, 1,3-di(p-chlorophenyl), 1,3-di(p-ethoxycarbonylphenyl), their 1-aryl derivatives (e.g. 1-phenyl, 1-p-chlorophenyl, 1-p-ethoxycarbonylphenyl), or their 1-alkyl-3-aryl derivatives (e.g. 1-ethyl-3-phenyl, 1-n-heptyl-3-phenyl), those of the 2-thio-2,4-thiazolidinedione (rhodanine) series (e.g. 3-ethyl-2-thio-2,4-thiazolidinedione, 3-allyl-2-thio-2,4-thiazolidinedione, 3-phenyl-2-thio-2,4 - thiazolidinedione), those of the 2-oxo(3H)-imidazo[1,2-a]pyridine series, those of the 5,7-dioxo-6,7-dihydro-5-thiazol[3,2-$\alpha$] pyrimidine series (e.g. 5,7-dioxo-3-phenyl-6,7-dihydro-5-thiazolo[3,2-$\alpha$]-pyrimidine), those of the 2-thio-2,4-oxazolidinedione series (e.g. 3-ethyl-2-thio-2,4-oxazolidinedione), those of the thianaphthenone series (e.g. 3-(2H -thianaphthenone), those of the 2-thio-2,5-thiazolidinedione series (e.g. 3-ethyl-2-thio-2,5-thiazolidinedione), those of the 2,4-thiazolidinedione series (e.g. 2,4-thiazolidinedione, 3-ethyl-2,4-thiazolidinedione, 3-phenyl-2,4-thiazolidinedione, 3-(1-naphthyl)-2,4-thiazolidinedione), those of the thiazolidinone series (e.g. 4-thiazolidinone, 3-ethyl-4-thiazolidinone, 3 - phenyl - 4-thiazolidinone, 3-$\alpha$-naphthyl-4-thiazolidinone), those of the 4-thiazolinone series (e.g. 2-ethylmercapto-4-thiazolinone, 2-alkylphenylamino-4-thiazolinones, 2-diphenylamino-4-thiazolinone), those of the 2-imino-4-oxazolidinone (pseudohydantoin) series, those of the 2,4-imidazolinedione (hydantoin) series (e.g. 2,4-imidazolinedione, 3-ethyl-2,4-imidazolinedione, 3-phenyl-2,4-imidazolinedione, 3-(1-naphthyl)-2,4-imidazolinedione, 1,3-diethyl-2,4-imidazolinedione, 1-ethyl-3-phenyl - 2,4- imidazolinedione, 1-ethyl-3-(1-naphthyl)-2,4-imidazolinedione, 1,3-diphenyl-2,4-imidazolinedione), those of the 2-thio-2,4-imidazolinedione (2-thiohydantoin) series (e.g. 2-thio-2,4-imidazolinedione, 3-ethyl-2-thio-2,4-imidazolinedione, 3-phenyl-2-thio-2,4-imidazolinedione, 3-(1-naphthyl)-2-thio-2,4-imidazolinedione, 1,3-diethyl-2-thio-2,4-imidazolinedione, 1-ethyl-3-phenyl-2-thio-2,4-imidazolinedione, 1-ethyl-3-(1-naphthyl)-2-thio-2,4-imidazolinedione, 1,3-diphenyl-2-thio-2,4-imidazolinedione), those of the 5-imidazolinone series (e.g. 2-n-propylmercapto-5-imidazolinone), (especially a heterocyclic nucleus with negative character containing 5 to 6-atoms in the heterocyclic ring, 3 to 4 of said atoms being carbon atoms, 1 of said atoms being a nitrogen atom and 1 of said atoms being a nitrogen atom, an oxygen atom or a sulphur atom).

The new methine dye salts, merocyanine dyes, rhodacyanine dyes, polymerocyanine dyes and styryl dyes are prepared starting from the 1,5-cyclomethylene tetrazolium quaternary salts represented by the general formula:

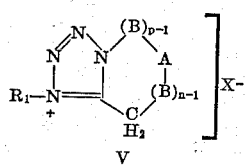

wherein:

$(B)_{p-1}$, $(B)_{n-1}$, $p$, $n$, $X^-$, A and $R_1$ have the same significance as set forth above.

The preparation of 6,7-dihydro-5-pyrrolotetrazole otherwise known at trimethylene tetrazole is described in the U.S. patent specification 2,020,937. The catalytic hydrogenation of pyridotetrazole to tetrahydropyrido tetrazole is described in the U.S. patent specification 2,008,536.

The corresponding quaternary salts of these tetrazole bases can be prepared in the usual way.

It has been stated that dihydroquinolinotetrazoles of the following formula:

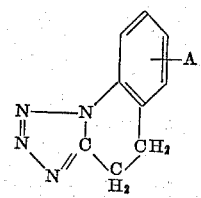

wherein:

A represents a substituent e.g. a halogen atom or an alkyl group, cannot be prepared by hydrogenating the corresponding cyclic unsaturated compounds since the tetrazole ring opens during hydrogenation.

It has now been found that the quaternated tetrazole nucleus resists better hydrogenation than the unquaternated tetrazole nucleus. Therefore, up to now unknown tetrazolium salts can be prepared according to the following reaction scheme:

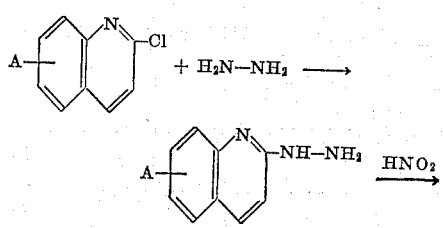

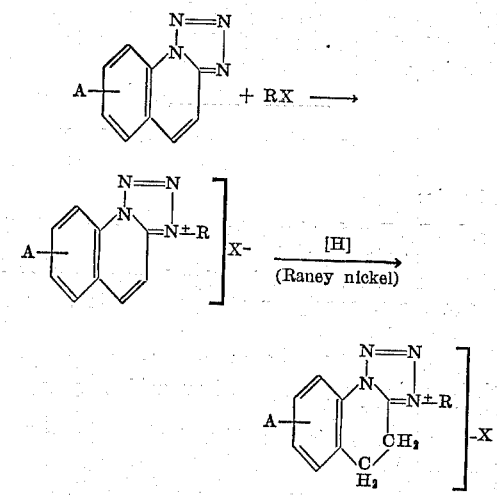

The preparation of unsubstituted quinolinotetrazole is described by G. A. Reynolds and J. A. Van Allan in J. Org. Chem. 24 (1959) 1478/86. More details with regard to the preparation of the tetrazolium salt and its hydrogenation are given in the preparations.

This new method for preparing 1,3-cyclomethylene tetrazolium salts can also successfully be applied for the preparation of 1,5-cyclomethylene tetrazolium salts the corresponding bases of which have a tetrazole nucleus which is sufficiently stable to hydrogenation.

A 1,5-cyclomethylene tetrazolium quaternary salt according to Formula V can either be directly condensed in the known way with a known dye intermediate in order to form a methine dye, or it can be converted into a dye intermediate, as is currently used in the chemistry of cyanine dyes, and which can be used according to a known method for the preparation of a methine dye.

The following description of some methods for preparing the new methine dye salts, merocyanine dyes, rhodacyanine dyes, polymerocyanine dyes and styryl dyes is not complete and therefore is not to be considered as limiting the scope of our invention but merely as a survey of the most usual condensation methods.

New asymmetrical methine dye salts according to the present invention can be prepared by condensing a 1,5-cyclomethylene tetrazolium salt of the general Formula V with a cycloammonium quaternary salt represented by the following formula:

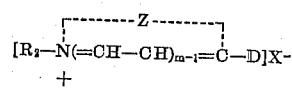

wherein:

$R_2$, $X^-$, Z and $m$ have the same value as set forth above in Formula III;

D represents a halogen atom, an alkylmercapto group, an arylmercapto group, a β-arylamino vinyl group, a δ-arylamino-1,3-butadienyl group, a β-alkylmercapto vinyl group, a β-arylmercapto vinyl group, a β-acetanilido which vinyl group may carry a substituent.

The condensations of this type are advantageously carried out in the presence of a basic condensing agent, for example a trialkylamine such as triethylamine, a dialkylaniline, a heterocyclic tertiary amine such as pyridine or N-alkyl-piperidine or the like. The condensation can also be carried out in the presence of an inert diluent such as methanol, ethanol, diethyl-ether, acetone, 1,4-dioxane etc.

New asymmetrical methine dye salts according to the present invention can also be prepared by condensing a 1,5-cyclomethylene tetrazolium salt of the general Formula V with a heterocyclic base, known in cyanine dye chemistry, of the following formula:

$$R_2-N(-CH=CH)_{m-1}-\overset{\overset{\displaystyle Z}{|}}{C}=L_2-L_3=Y$$
VIa wherein:

$L_2$, $L_3$, $R_2$, $Z$ and $m$ have the same value as set forth above in Formula III, and Y represents a reactive functional group such as an oxygen atom, a sulphur atom, a selenium atom or an aryl-N= group.

The condensation of this type is advantageously carried out in the presence of an acid anhydride such as acetic anhydride.

New asymmetrical methine dye salts according to the present invention can also be prepared by condensing an intermediate represented by the following formula:

$$\left[ D_1(-L_1=L_2)_{d-1}-L_3=C \begin{array}{c} R_1 \\ | \\ {}^+N\text{———}N \\ \diagdown \quad \diagdown \\ \quad \quad N \\ \diagup \\ (B')_{p'-1} \\ (B')_{n'-1}-A' \end{array} \right] \cdot X^-$$
VII wherein:

$D_1$ represents an alkylmercapto group, an aryl mercapto group, an arylamino group, an acetanilido group or a p-tolusulphanilido group, and $R_1$, $L_1$, $L_2$, $L_3$, $A'$, $(B')_{n'-1}$, $(B')_{p'-1}$, $d$ and $X^-$ have the same significance as set forth above, with a cyclammonium quaternary salt containing a methyl group in α- or γ-position, such as those represented by the general Formula VI but wherein D represents a methyl group.

The condensations of this type are advantageously carried out in the presence of a basic condensing agent.

New asymmetrical methine dye salts according to the present invention can also be prepared by condensing an intermediate represented by the following formula:

$$Y(=L_1-L_2)_{d-1}=L_3-C \begin{array}{c} R_1 \\ | \\ N\text{———}N \\ \diagdown \quad \diagdown \\ \quad \quad N \\ \diagup \\ (B')_{p'-1} \\ (B')_{n'-1}-A' \end{array}$$
VIIa wherein:

Y, $R_1$, $L_1$, $L_2$, $L_3$, $A'$, $(B')_{n'-1}$, $(B')_{p'-1}$ and $d$ have the same significance as set forth above, with cyclammonium quaternary salts containing a methyl group in α- or γ-position, such as those represented by the general Formula VI but wherein D represents a methyl group.

The condensations of this type are advantageously carried out in the presence of an acid anhydride.

Other asymmetrical methine dye salts according to the present invention can be prepared by condensing a compound of Formula VII or VIIa with a compound of Formula V, but whereby in the compound of the Formula VII or VIIa at least one of the radicals represented by $A'$, $(B')_{p'-1}$, $(B')_{n'-1}$ and $R_2$ has not the same value as respectively A, $(B)_{p-1}$, $(B)_{n-1}$, and $R_1$ of the Formula V.

The intermediates represented by the Formula VII can be prepared by condensing a 1,5-cyclomethylene tetrazolium salt e.g. from those represented by the Formula V with a compound represented by one of the following formulae:

aryl—N=$(L_1-L_2=)_{d-1}L_3$—NH—aryl     VIIIa or aryl—N=$(L_1-L_2=)_{d-1}L_3$—S—alkyl     VIIIb wherein:

$L_1$, $L_2$, $L_3$ and $d$ have the same significance as set forth in Formula VII.

The compounds according to Formula VII, wherein $D_1$ represents an acetanilido group can be prepared by condensing a 1,5-cyclomethylene tetrazolium salt according to Formula V with a compound according to Formula VIIIa and then boiling the obtained intermediate with acetic anhydride.

The new symmetrical methine dye salts according to the present invention can be prepared by condensing a 1,5-cyclomethylene tetrazolium salt of the Formula V with a compound of the Formula VII or VIIa, the radicals representing by $A'$, $(B')_{p'-1}$, $(B')_{n'-1}$, $R_1$ having the same value as A, $(B)_{p-1}$, $(B)_{n-1}$, and $R_1$ respectively.

The new merocyanine dyes according to the present invention can be prepared by condensing a 1,5-cyclomethylene tetrazolium quaternary salt represented by the Formula V with a heterocyclic compound represented by the following formula:

$$\begin{array}{c} P \\ \diagdown \\ C=(L_3-L_2)_{e-1}L_1-E \\ \diagup \\ Q \end{array}$$

wherein:

P, Q, $L_1$, $L_2$, $L_3$ and $e$ have the same significance as described in the Formula IV;

E represents a reactive negative atom or group e.g. a halogen atom, such as a chlorine atom, a bromine atom or an iodine atom, a cyano group, an alkyl- or aryl mercapto group, an alkoxy group, an arylamino group, an acetanilido group or a p-tolusulphanilido group.

The new di- and tetramethine merocyanine dyes according to the present invention can also be prepared by condensing an acetanilide intermediate represented by the Formula VII or VIIa given above, with a compound represented by the following general formulae:

$$\begin{array}{cc} P & P \\ \diagdown & \diagdown \\ C=L_3-CH_3 \text{ or } & CH_2 \\ \diagup & \diagup \\ Q & Q \end{array}$$

wherein P, Q and $L_3$ have the same significance as set forth above.

The new styryl dyes according to the present invention can be prepared by condensing a 1,5-cyclomethylene tetrazolium salt according to Formula V with a p-dialkylaminobenzaldehyde advantageously in the presence of a carboxylic anhydride, e.g. acetic anhydride.

The following are preparations of the most important intermediate products for preparing optical sensitizers arcording to the present invention.

*Preparation 1.*—1-methyl-6,7-dihydro-5H-pyrrolotetrazolium methyl sulfate of formula:

$$\left[ \begin{array}{c} \quad\quad\quad CH_3 \\ \quad H_2 \quad\quad | \\ \quad C \quad +N \\ \diagup \quad \diagdown \diagdown \\ H_2C \quad\quad C \quad\quad N \\ | \quad\quad\quad \| \\ H_2C\text{———}N\text{———}N \end{array} \right] CH_3SO_4^-$$

is prepared as follows:

A mixture of 4.4 g. of 6,7-dihydro-5H-pyrrolotetrazole and 4 cm.³ of dimethyl sulfate is heated for 15 min. on an oil bath at 100°–110° C. The reaction proceeds exothermally.

Thereupon the mixture is washed with ether whereby the quaternary salt is obtained as a colourless syrupy liquid which is used as such for the synthesis of the methine dyes.

*Preparation 2.*—1-ethyl-6,7-dihydro-5H-pyrrolotetrazolium ethyl sulfate of formula:

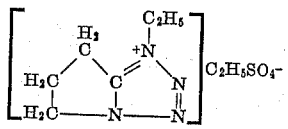

is prepared as follows:

A mixture of 4.4 g. of 6,7-dihydro-5H-pyrrolotetrazole and 5.5 cm.³ of diethyl sulfate is heated for 1 hr. on an oil bath at 130° C.

The mixture is washed with ether whereby the quaternary salt is obtained as a colourless syrupy liquid which is used as such for the synthesis of the methine dyes.

*Preparation 3.*—1-ethyl-5,6,7,8-tetrahydrotetrazoliumpyridine ethyl sulfate of formula:

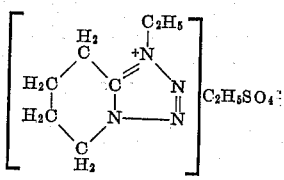

is prepared as follows:

A mixture of 5 g. of 5,6,7,8-tetrahydrotetrazolopyridine and 5.6 cm.³ of diethyl sulfate is heated for 1 hr. on an oil bath at 130° C.

Thereupon the mixture is washed with ether whereby the quaternary salt is obtained as a light brown syrupy liquid which is used as such in the synthesis of the methine dyes.

*Preparation 4.*—1 - methyl - 5,6,7,8-tetrahydrotetrazoliumpyridine methyl sulfate of formula:

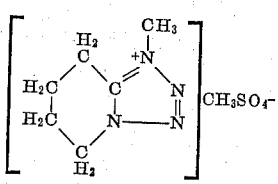

is prepared as follows:

A mixture of 5 g. of 5,6,7,8-tetrahydrotetrazolopyridine and 4 cm.³ of dimethyl sulfate is heated for 30 min. on a water bath.

Thereupon the mixture is washed with ether whereby the quaternary salt is obtained as a syrupy liquid which is used as such in the synthesis of the methine dyes.

*Preparation 5.*—1-methyl-5-phenyl-5,6,7,8-tetrahydrotetrazoliumpyridine iodide of formula:

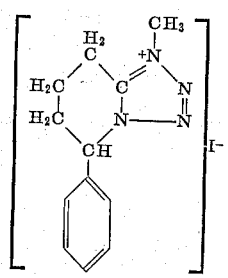

is prepared by the following steps:

(1) Preparation of 1-methyl-5-phenyltetrazoliumpyridine iodide: 7.5 g. of 5-phenyltetrazolopyridine and 6 cm.³ of methyl iodide are heated for 6 h. in a sealed tube at 105° C. The obtained quaternary salt is washed with ether and acetone. Yield: 11.8 g. (90%). Melting point: 214° C.

(2) Preparation of 1-methyl-5-phenyl-5,6,7,8-tetrahydrotetrazoliumpyridine iodide: 3.4 g. of 1-methyl-5-phenyltetrazoliumpyridine iodide are dissolved in 100 cm.³ of ethanol and hydrogenated at room temperature with Raney nickel as a catalyst. Thereupon the catalyst is filtered off and the filtrate is evaporated. Then the residue is washed with ether. Yield: 3.1 g. (90%).

After recrystallization from ethanol the melting point is 177° C.

*Preparation 6.*—3-ethyl-4,5-dihydrotetrazolium[1,5-a]quinoline iodide of formula:

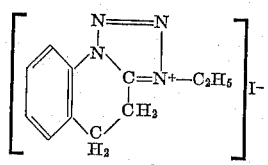

is prepared by the following steps:

(1) Preparation of 3-ethyltetrazolium[1,5-a]quinoline iodide: 20 g. of tetrazolo[1,5-a]quinoline prepared according to W. Marckwald and E. Meyer, Ber. 33 (1900) 1897 and 14 cm.³ of ethyl iodide are heated for 2 h. at 100° C. and then for 6 h. at 145° in a sealed tube. After cooling, the solidified reaction mass is pulverized and washed with ether.

The yield of crude product amounts to 38 g. This is recrystallized from a mixture of ethanol/water (5:1). The crystals are sucked off and washed with ether. Melting point: 224° C.

(2) Preparation of 3-ethyl-4,5-dihydrotetrazolium[1,5-a]quinoline iodide: 155 g. of 3-ethyltetrazolium[1,5-a]quinoline iodide are dissolved in 1500 cm.³ of a mixture of ethanol and water (1:1). After adding 20 g. of Raney nickel the product is hydrogenated in a shaking autoclave under a pressure of 250 p.s.i. hydrogen at 23° C.

After 3 h., 93% of the calculated amount of hydrogen is consumed. Thereupon the hydrogenation mixture is warmed till the hydrogenated quaternary salt is completely dissolved. The Raney nickel is then filtered off and the filtrate is cooled. The formed crystals are sucked off and washed with ethanol and ether. Yield: 95 g. Melting point: 231° C.

*Preparation 7.*—3-ethyl-7-methyl-4,5-dihydrotetrazolium[1,5-a]quinoline iodide of formula:

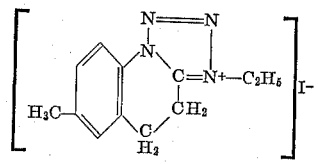

is prepared according to the following steps:

(1) Preparation of 2-chloro-6-methylquinoline: A mixture of 47 g. of 1,6-dimethyl-2-quinolone, 45 g. of phosphorus oxychloride and 90 g. of phosphorus pentachloride is heated for 8 h. on an oil bath of 175° C. The excess of phosphorus oxychloride is distilled off and the residue is treated with sodium hydroxide whereupon the 2-chloro-6-methylquinoline is steam distilled. The distillate is extracted with ether and the extract evaporated after drying. Yield: 32.5 g. (70%).

After recrystallization from acetone the melting point is 114° C.

(2) Preparation of 2-hydrozino-6-methylquinoline: Whilst stirring, a mixture of 12 g. of 2-chloro-6-methylquinoline and 60 cm.³ of hydrazine is refluxed for 6 h. The precipitate, formed on cooling, is filtered off and washed with water. Yield: 10 g. (80%). Melting point: 150° C.

(3) Preparation of 7-methyl-tetrazolo[1,5-a]quinoline: This product is prepared starting from 2-hydrazino-6-methylquinoline, according to a method described by G. A. Reynolds and J. A. Van Allan, J. Org. Chem. 24 (1959) 1478/86. Melting point: 163° C.

(4) Preparation of 3-ethyl-7-methyltetrazolium[1,5-a] quinoline iodide: 14 g. of 7-methyltetrazolo[1,5-a]quinoline and 9 cm.³ of ethyl iodide are heated for 8 h. in a sealed tube at 140° C. The quaternary salt is pulverized and washed with ether. Yield: 19 g. (75%). After recrystallization from ethanol the melting point is 217° C.

(5) Preparation of 3-ethyl-7-methyl-4,5-dihydrotetrazolium[1,5-a]quinoline iodide: 19 g. of 3-ethyl-7-methyltetrazolium[1,5-a]quinoline iodide are dissolved in 200 cm.³ of a mixture consisting of equal parts of ethanol and water. After adding a platinum catalyst, the mixture is hydrogenated at 60°–65° C. Thereupon the catalyst is filtered off and the filtrate is evaporated. The residue is recrystallized from absolute ethanol. Yield: 7 g. (35%). Melting point: 210° C.

*Preparation 8.*—3 - ethyl - 7 - chloro-4,5-dihydrotetrazolium[1,5-a]quinoline iodide of formula:

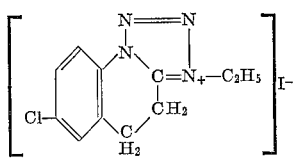

is prepared by the following steps:

(1) Preparation of 2,6-dichloroquinoline: This product is prepared from 1-methyl-6-chloro-2-quinolone analogously to the method described for the preparation of 2-chloro-6-methylquinoline. Melting point: 143° C.

(2) Preparation of 2 - hydrazino-6-chloroquinoline: 47 g. of 2,6-dichloroquinoline and 235 cm.³ of hydrazine are refluxed for 6 h. whilst stirring. The formed precipitate is sucked off, washed with water and recrystallized from ethanol. Yield: 32 g. (70%). Melting point: 194° C.

(3) Preparation of 7-chlorotetrazolo[1,5-a]quinoline: This product is prepared analogously to tetrazolo[1,5-a]quinoline from 2-hydrazino-6-chloroquinoline. Melting point: 218° C.

(4) Preparation of 3-ethyl-7-chlorotetrazolium[1,5-a]quinoline iodide: 6.3 g. of 7-chlorotetrazolo[1,5-a]quinoline and 5 cm.³ of ethyl iodide are heated for 16 h. in a sealed tube at 135° C. The quaternary salt is washed with ether. Yield: 9.8 g. (80%). Melting point: 265° C.

(5) Preparation of 3-ethyl-7-chloro-4,5-dihydrotetrazolium[1,5-a]quinoline iodide: 10 g. of 3-ethyl-7-chlorotetrazolium[1,5-a]quinoline iodide, dissolved in 100 cm.³ of a mixture of equal parts of ethanol and water, are hydrogenated at room temperature with Raney nickel catalyst. Thereupon the catalyst is filtered off and the filtrate is evaporated. The residue is recrystallized from ethanol. Yield: 7.8 g. (78%). Melting point: 265° C.

The following examples illustrate the preparation of the new methine dyes containing at least one 1,5-cyclomethylene tetrazole nucleus:

*Example 1*

The sensitizing dye of formula:

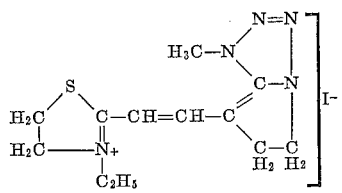

is prepared as follows:

2.3 g. of 1-methyl-6,7-dihydro-5H-pyrrolotetrazolium methyl sulfate and 2.3 g. of 2-(β-anilethylidene)-3-ethylthiazolidine are dissolved in 20 cm.³ of acetic anhydride and heated on a boiling water bath for 15 min. The dye, precipitated with ether, is converted into the iodide and purified by recrystallization from ethanol. Melting point: ±130° C. Absorption maximum: 426 mμ; log ε: 4.78.

*Example 2*

The sensitizing dye of formula:

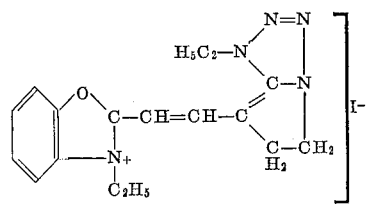

is prepared as follows:

5.5 g. of 1-ethyl-6,7-dihydro-5H-pyrrolotetrazolium ethyl sulfate and 7 g. of 2-acetanilidovinyl-3-ethylbenzoxazolium iodide are dissolved in 50 cm.³ of absolute ethanol and refluxed for 1 h. with 5 cm.³ of triethylamine. The dye is precipitated with a potassium iodide solution and purified by recrystallization from ethanol. Melting point: 260° C. with decomposition. Absorption maximum: 442 mμ; log ε: 4.90.

*Example 3*

The sensitizing dye of formula:

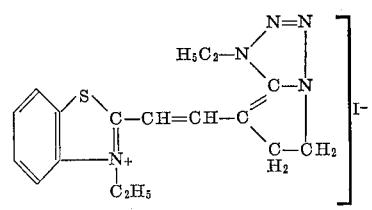

is prepared as follows:

2.65 g. of 1-ethyl-6,7-dihydro-5H-pyrrolotetrazolium ethyl sulfate and 2.5 g. of 2-(β-anilethylidene)-3-ethyl-2,3-dihydrobenzothiazole are dissolved in 20 cm.³ of acetic anhydride, and then heated for 10 min. with 2.8 cm.³ of triethylamine.

After precipitating with ether, the dyestuff is converted into its iodide and purified by recrystallizing four times from a mixture of ethylene glycol monomethyl ether and ethanol. Melting point: 250° C. with decomposition. Absorption maximum: 476 mμ; log ε: 4.99.

*Example 4*

The sensitizing dye of formula:

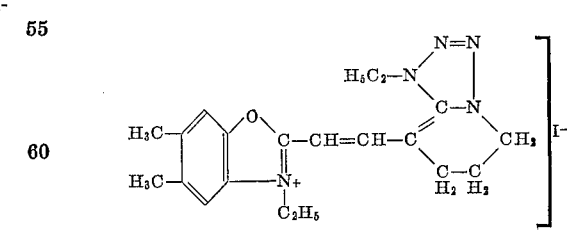

is prepared as follows:

2.7 g. of 1-ethyl-5,6,7,8-tetrahydrotetrazoliumpyridine ethyl sulfate and 3 g. of 2-(β-anilethylidene)-3-ethyl-5,6-dimethyl-2,3-dihydrobenzoxazole are dissolved in 20 cm.³ acetic anhydride and heated for 15 min. with 2.8 cm.³ of triethylamine. After precipitating with ether the dye is converted into the corresponding iodide and purified by recrystallizing several times from a mixture of methanol and ethylene glycol monomethyl ether. Melting point: 244° C. Absorption maximum: 448 mμ; log ε: 4.99.

Example 5

The sensitizing dye of formula:

[structure]

is prepared as follows:

3.5 g. of 3-ethyl-4,5-dihydrotetrazolium[1,5-a]quinoline iodide and 3.5 g. of 2-(β-anilethylidene)-3-ethyl-5-phenyl-2,3-dihydrobenzoxazole are dissolved in 30 cm.³ of acetic anhydride and boiled for 5 min.

The dyestuff is purified by recrystallizing two times from a mixture of diethylene glycol monomethylether and ethanol. Melting point: >270° C. Absorption maximum: 482 mμ; log ε: 5.03.

Example 6

The sensitizing dye of formula:

[structure]

is prepared as follows:

2.5 g. of 1,3-diethyl-2-[β-(p-tolusulphoanilido)-vinyl]-5-cyanobenzimidazolium chloride and 1.6 g. of 3-ethyl-4,5-dihydrotetrazolium[1,5-a]quinoline iodide are dissolved in 15 cm.³ of pyridine and refluxed for 20 min. with 1.4 cm.³ of triethylamine.

After cooling, the crystallized dye is filtered off and recrystallized four times from ethanol. Melting point: >250° C. Absorption maximum: 494 mμ; log ε: 5.06.

Example 7

The sensitizing dye of formula:

[structure]

is prepared as follows:

3 g. of 2-methylmercapto-3-methyl benzothiazolium methylsulphate and 3.3 g. of 3-ethyl-4,5-dihydrotetrazolium[1,5-a]quinoline iodide are dissolved in 30 cm.³ of absolute ethanol and refluxed for 15 min. with 2.8 cm.³ of triethylamine. The obtained solution is poured out into water and the precipitated dye is recrystallized from methanol. Melting point: 197° C. Absorption maximum: 427 mμ; log ε: 4.42.

Example 8

The sensitizing dye of formula:

[structure]

is prepared as follows:

7.86 g. of 2-[β-(acetanilido)-vinyl]-3-ethyl-5-phenyl-benzothiazolium iodide and 5 g. of 3-ethyl-4,5-dihydrotetrazolium[1,5-a]quinoline iodide are dissolved in 25 cm.³ of ethanol and stirred for 2 h. with 4.2 cm.³ of triethyl amine and 50 cm.³ of acetic anhydride whilst cooling with ice. The formed dyestuff is sucked off and purified by recrystallizing five times from pyridine. Melting point: 240° C. Absorption maximum: 518 mμ; log ε: 4.86.

Example 9

The sensitizing dye of formula:

[structure]

is prepared as follows:

3.3 g. of 2-(β-anilethylidene)-3-ethyl-2,3-dihydrobenzoselenazole and 3.9 g. of 3-ethyl-4,5-dihydrotetrazolium [1,5-a]quinoline iodide are heated for 5 min. on a water bath with 30 cm.³ of acetic anhydride.

The precipitated dyestuff is sucked off, washed with ethanol, and purified by recrystallization from methanol. Melting point: 260°–270° C. Absorption maximum: 516 mμ; log ε: 4.94.

Example 10

The sensitizing dye of formula:

[structure]

is prepared as follows:

7.53 g. of 2-[β-(acetanilido)vinyl]-3-ethylnaphtho-[1,2-d]-thiazolium iodide and 4.92 g. of 3-ethyl-4,5-dihydrotetrazolium[1,5-a]quinoline iodide are dissolved in 40 cm.³ of pyridine. At a temperature of 5° C., 5 cm.³ of acetic anhydride and 4.2 cm.³ of triethyl amine are added. After 2 h. of stirring at 0° C. the dye is sucked off and purified by recrystallizing three times from a mixture of methylcarbitol and water. Melting point >250° C. Absorption maximum: 531 mμ; log ε: 4.97.

Example 11

The sensitizing dye of formula:

[structure]

is prepared as follows:

6.5 g. of 1,3-diethyl-2[β-(p-tolusulphoanilido)vinyl]-5,6-dichlorobenzimidazolium chloride and 4 g. of 3-ethyl-7-chloro-4,5-dihydrotetrazolium[1,5-a]quinoline iodide are suspended in 45 cm.³ of pyridine and refluxed for 30 min. with 1.55 cm.³ of triethylamine. After cooling, the crystallized dye is sucked off, washed with methanol and recrystallized from dimethyl sulphoxide. Melting point: 235° C. Absorption maximum: 494 mμ; log ε: 5.09.

Example 12

The sensitizing dye of formula:

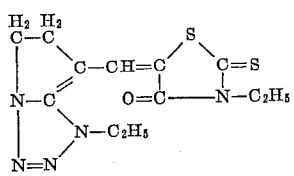

is prepared as follows:

5.3 g. of 1-ethyl-6,7-dihydro - 5H - pyrrolotetrazolium-ethylsulphate and 6 g. of 3-ethyl-5-acetanilidomethylene-2-thio-2,4-thiazolidinedione are dissolved in 80 cm.³ of absolute ethanol and are refluxed for 4 h. with 5.6 cm.³ of triethylamine. After cooling, the crystallized dye is purified by recrystallizing three times from a mixture of ethylene glycol monomethyl ether and ethanol. Melting point: 270° C. with decomposition. Absorption maximum: 488 m$\mu$; log $\epsilon$: 4.95.

Example 13

The sensitizing dye of formula:

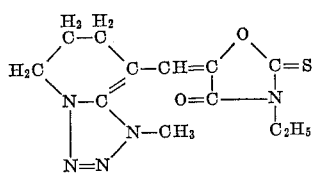

is prepared analogously to Example 12, starting from 1.8 g. of 1-methyl-5,6,7,8-tetrahydrotetrazoliumpyridine methylsulfate and 2 g. of 3-ethyl-5-acetanilidomethylene-2-thio-2,4-oxazolidinedione. Melting point: >270° C. Absorption maximum: 461 m$\mu$. Log $\epsilon$: 4.87.

Example 14

The sensitizing dye of formula:

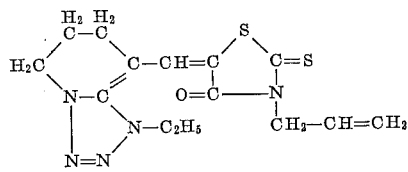

is prepared analogously to Example 12, starting from:

5.6 g. of 1-ethyl-5,6,7,8-tetrahydrotetrazoliumpyridine ethyl sulfate and 6 g. of 3-allyl-5-acetanilidomethylene-2-thio-2,4-thiazolidinedione.

The dyestuff is purified by recrystallizing three times from a mixture of ethylene glycol monomethyl ether and ethanol. Melting point: 240° C. Absorption maximum: 490 m$\mu$; log $\epsilon$: 4.95.

Example 15

The sensitizing dye of formula:

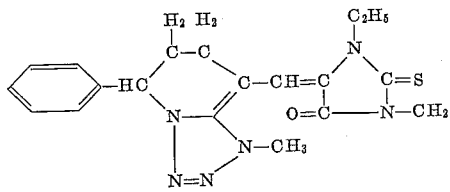

is prepared analogously to Example 12, starting from 3.2 g. of 1-methyl-5-phenyl-5,6,7,8-tetrahydrotetrazoliumpyridine iodide and 3 g. of 1-ethyl-3-methyl-5-acetanilidomethylene-2-thio-2,4-imidazolinedione. Melting point: 204° C. Absorption maximum: 486 m$\mu$; log $\epsilon$: 4.88.

Example 16

The sensitizing dye of formula:

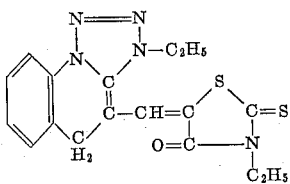

is prepared as follows:

6.6 g. of 3-ethyl-4,5-dihydrotetrazoliumquinoline iodide and 6.8 g. of 3-ethyl-5-acetanilidomethylene-2-thio-2,4-thiazolidinedione are dissolved in 150 cm.³ of absolute ethanol and refluxed for 10 minutes with 5.6 cm.³ of triethylamine. The formed dye is sucked off and recrystallized two times from a mixture of toluene and hexane. Melting point: 235° C. with decomposition. Absorption maximum: 514 m$\mu$; log $\epsilon$: 4.87.

Example 17

The sensitizing dye of formula:

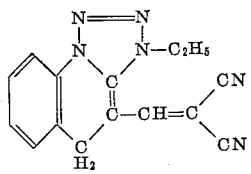

is prepared analogously to Example 16, starting from 5.9 g. of 3-ethyl-4,5-dihydrotetrazolium[1,5-a]quinoline iodide and 3.8 g. of acetanilidomethylene malononitrile. Melting point: 255° C. Absorption maximum: 424 m$\mu$; log $\epsilon$: 4.68.

Example 18

The sensitizing dye of formula:

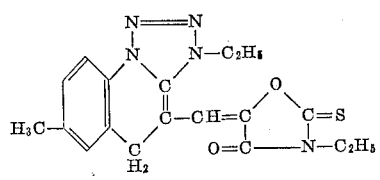

is prepared analogously to Example 16, starting from 3.5 g. of 3-ethyl-7-methyl-4,5-dihydrotetrazolium[1,5-a]quinoline iodide and 2.9 g. of 3-ethyl-5-acetanilidomethylene-2-thio-2,4-oxazolidinedione. Melting point: 214° C. Absorption maximum: 490 m$\mu$; log $\epsilon$: 4.96.

Example 19

The sensitizing dye of formula:

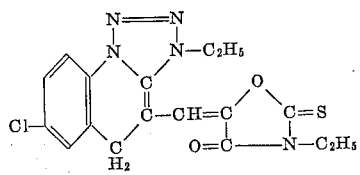

is prepared analogously to Example 16, starting from 3.6 g. of 3-ethyl-7-chloro-4,5-dihydrotetrazolium[1,5-a]quinoline iodide and 2.9 g. of 3-ethyl-5-acetanilidomethylene-2-thio-2,4-oxazolidinedione. Melting point: 220° C. Absorption maximum: 494 m$\mu$; log $\epsilon$: 4.95.

Example 20

To 100 cm.³ of a 4% solution of copoly(vinyl acetate/vinyl laurate) (80/20) in ethanol, 15 g. of photoconductive zinc oxide are added. The mixture is ground in a ball mill for 15 hours, whereupon the following composition is added whilst thoroughly stirring:

10% solution of monobutyl phosphate in ethanol cm.³__ 1
5% solution of succinic acid in ethanol ____cm.³__ 2
Sensitizing dye of Example 5 _____mg__ 4

The photoconductive dispersion obtained is roller-coated onto a baryta-coated paper support of 90 g./sq. m. in such a way, that after drying the material, 20 g. of zinc oxide are present per sq. m.

The photoconductive layer is charged by a corona till −300 v./cm. by means of a tension of −7,000 v. on the corona wires and subsequently exposed through a grey-wedge. To light having a wave-length of 505 m$\mu$, this material is 8 times as sensitive as the non-sensitized material.

As shown in the following table, the methine dyes of the present invention spectrally sensitize photographic silver halide emulsions when incorporated therein. Although these methine dyes are especially useful for extending the spectral sensitivity of silver halide emulsions, the methine dyes according to this invention possess also optical sensitizing properties for inorganic photoconductive compounds such as zinc oxide and for organic photoconductive compounds such as those described in the U.S. patent applications Ser. No. 6,627, now U.S. Patent No. 3,279,918; Ser. No. 21,098, now U.S. Patent No. 3,148,982; Ser. No. 74,791, now U.S. Patent No. 3,140,946; Ser. No. 6,625, now U.S. Patent No. 3,158,475; and Ser. No. 101,612, now abandoned; in the French patent specifications 1,299,926, 1,308,762 and 1,310,813, and in the Belgian patent specification 589,239, and for the organic polymeric photoconductive compounds such as those described in the U.S. patent applications Ser. Nos. 11,128, 11,129, now U.S. Patent No. 3,155,503; and 11,130, now U.S. Patent No. 3,131,060; and Ser. No. 85,474, now abandoned with divisional applications issued as U.S. Patent Nos. 3,240,594 and 3,240,595.

The new methine dyes according to this invention can be incorporated in the photoconductive layer by one of the methods customarily employed in the art.

It may be further noticed that the new methine dyes although they are especially useful for extending the spectral sensitivity of the customarily employed gelatino silver chloride, gelatino silver chloro-bromide, gelatino silver bromide, gelatino silver bromo-iodide and gelatino silver chloro-bromo-iodide emulsions, photographic emulsions containing water-permeable colloids other than gelatin, such as agar-agar, zein, collodion, water-soluble cellulose derivatives, polyvinyl alcohol or other hydrophilic synthetic or natural resins or polymeric compounds, may equally well be sensitized according to the present invention.

To prepare photographic emulsions sensitized according to this invention with one or more of the new methine dyes, the methine dyes are incorporated in the photographic emulsion by one of the methods customarily employed in the art. In practice it is convenient to add the dyes to the emulsion in the form of a solution in an appropriate solvent. The new methine dyes can be incorporated at any stage of the preparation of the emulsion and should be uniformly distributed throughout the emulsion. The concentration of the dyes in the emulsion can vary widely for example from 1 to 200 mg. per kg. of flowable emulsion and will vary according to the effect desired. The suitable and most economical concentration for any given emulsion will be apparent to those skilled in the art, upon making the ordinary tests and observations customarily used in the art of emulsion making.

The new methine dyes can be incorporated into photographic emulsions the general sensitivity of which has been increased by physical and chemical ripening. As suitable chemical sensitizers may be mentioned the well-known sulphur sensitizers such as allylisothiocyanate, allylthiourea, sodium thiosulphate, potassium selenocyanide, the natural sensitizers originating in the gelatin, the reducing sensitizers such as imino-aminomethane sulphinic acid and the derivatives thereof, further cadmium salts, and the salts of the noble metals such as gold, platinum and palladium.

On spectrally sensitizing silver halide emulsions which are chemically sensitized with cadmium salts such as cadmium chloride and on spectrally sensitizing silver halide emulsions containing a certain amount of copper ions, it has been established that the methine dyes according to this invention show important advantages with regard to the tetrazole merocyanines described in the German patent specification 1,019,418.

Light-sensitive emulsions sensitized by the latter merocyanines, show a considerable decrease in sensitivity and a shift in the sensitivity to the red when containing copper and/or cadmium ions. The sensitizing dyes according to this invention do not possess this disadvantage and especially the merocyanines according to this invention are excellent green-sensitizers.

The following Table 1 illustrates the stability of the optical sensitizing dyestuffs used in the present invention to cupric ions and compares it with that of the dyestuffs of the mentioned German patent specification. For this purpose 8 kg. of a silver bromo-iodide emulsion (3 mol percent of iodide) containing 0.15 mol of silver halide per kg. of emulsion are divided in 8 equal parts.

To part 1, 12 mg. of the following merocyanine dye according to the German patent specification 1,019,418 are added:

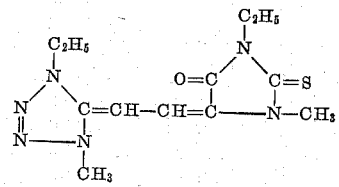

To part 2, the same amount of the merocyanine dye of part 1 and 10 mg. of cupric chloride are added.

To part 3, 12 mg. of the following merocyanine dye, prepared analogously to Example 15 herein, are added:

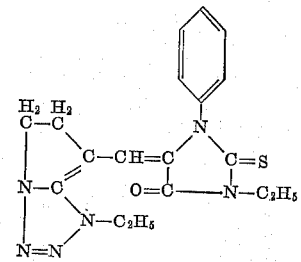

To part 4, the same amount of the merocyanine dye of part 3 and 10 mg. of cupric chloride are added.

To part 5, 12 mg. of the following merocyanine dye according to the German patent specification 1,019,418 are added:

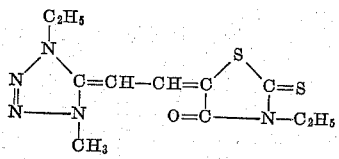

To part 6, the same amount of the merocyanine dye of part 5 and 10 mg. of cupric chloride are added.

To part 7, 12 mg. of the following merocyanine dye according to the present invention are added:

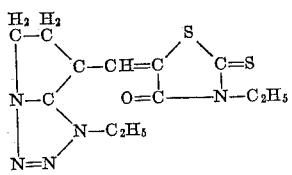

To part 8, the same amount of the merocyanine dye of part 7 and 10 mg. of cupric chloride are added.

These eight emulsion parts are separatedly coated in the same way on a baryta-coated paper support. Two series of emulsion strips 1 to 8 are cut. The strips of series I are exposed through a step-wedge of constant 0.1 and behind a band-filter having a maximum of transmittance at 530 m$\mu$. The strips of series II are exposed through a step-wedge of constant 0.1 and behind a filter only transmitting light of wave-lengths greater than 605 m$\mu$. The results are the following.

TABLE 1

| Test strips | Number of blackened steps | Test strips | Number of blackened steps |
|---|---|---|---|
| I 1 | 14 | II 1 | 0 |
| I 2 | 8 | II 2 | 18 |
| I 3 | 12 | II 3 | 0 |
| I 4 | 12 | II 4 | 0 |
| I 5 | 19 | II 5 | 2 |
| I 6 | 7 | II 6 | 2 |
| I 7 | 17 | II 7 | 2 |
| I 8 | 16 | II 8 | 1 |

Another advantage of sensitizing dyes according to the present invention with regard to the sensitizing tetrazole merocyanine dyes described in the German patent specification 1,019,418, is the good resistance to a decrease in sensitizing activity normally caused by 1-phenyl-2-mercaptotetrazole, a well-known silver halide emulsion stabilizer and anti-fogging agent described e.g. in the British patent specification 561,875 filed December 3. 1942 in the name of Ilford, used alone or in combination with cadmium salts.

In preparing the photographic emulsions according to the invention, the usual and suitable addenda such as antifogging agents, stabilizers, antibronzing agents, hardeners, wetting agents, plasticizers, development accelerators, colour couplers, fluorescent brighteners and ultraviolet screening compounds can moreover be incorporated in the emulsion in the manner customarily employed in the art. In this respect it may be mentioned that the sensitivity of the silver halide emulsions sensitized according to the process of the present invention is not adversely affected but rather enhanced by the presence therein of certain fluorescent compounds. Another advantage of the process for sensitizing silver halide emulsions according to the present invention is the compatibility of the new methine dyes with anionic wetting agents and with colour couplers, which is of great importance in the application of the new methine dyes for sensitizing the silver halide emulsions of a light-sensitive element for colour photography.

The photographic emulsions optically sensitized according to the invention may further be supersensitized and/or hypersensitized by one of the methods known to those skilled in the art.

Emulsions sensitized with the new methine dyes can be coated in the usual manner on a suitable support such as glass, cellulose derivative film, resin film or paper.

The following table will serve to illustrate further the manner of practising the invention. The optimum amounts of a new sensitizing methine dye are incorporated into different portions of photographic gelatino-silver halide emulsions prepared with varying contents and kinds of halides. The different portions of emulsions are then coated on a support and exposed in the usual manner in a spectograph and a sensitometer. For the determination of the "total" speed the exposure of the sensitized light-sensitive material is executed without filter with a normal light or an incandescent lamp. For the determination of the speed "minus blue" the exposure of the sensitized light-sensitive material is executed through a yellow filter which transmits no light of wave-lengths shorter than 510 m$\mu$, for example a filter sold under the name "Geva 4" by Gevaert Photo-Production N.V., Belgium. The following are several examples of such emulsions together with the speeds obtained after development of the exposed emulsions. These speed values are calculated in relation to the speed values of respectively the same, but non-sensitized emulsions.

| Dye of Example | Amount of dye in the emulsion, mg./kg. | Emulsion type | Sensitization maximum, m$\mu$ | Speed (blue) | Total speed |
|---|---|---|---|---|---|
| 1 | 50 | AgCl | 460 |  | 815 |
| 2 | 20 | AgCl | 475 |  | 360 |
| 3 | 20 | AgCl/AgBr | 515 |  | 400 |
| 4 | 20 | AgCl | 495 |  | 1,100 |
| 5 | 20 | AgBr/AgI | 545 | 800 |  |
| 6 | 30 | AgCl/AgBr | 535 | 350 |  |
| 7 | 30 | AgCl | 530 |  | 210 |
| 8 | 20 | AgCl | 550 | 600 |  |
| 9 | 30 | AgCl | 560 |  | 675 |
| 10 | 30 | AgCl/AgBr | 576 | 450 |  |
| 11 | 30 | AgCl | 530 |  | 325 |
| 12 | 30 | AgCl | 540 |  | 810 |
| 13 | 20 | AgCl/AgBr | 505 |  | 375 |
| 14 | 30 | AgCl | 510 |  | 655 |
| 15 | 20 | AgCl/AgBr | 530 |  | 360 |
| 16 | 30 | AgCl | 565 |  | 500 |
| 17 | 30 | AgCl | 540 |  | 650 |
| 18 | 20 | AgCl/AgBr | 535 |  | 610 |
| 19 | 20 | AgCl/AgBr | 535 |  | 390 |

We claim:
1. An asymmetrical methine dye salt of the following general formula:

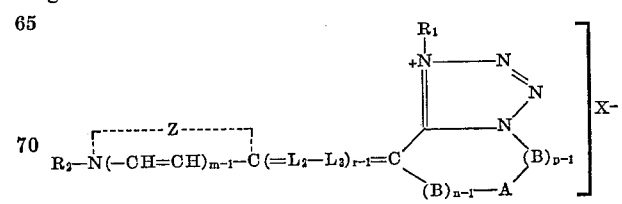

wherein:
B is a methylene group,

A is a group selected from the group consisting of a methylene group, and the group $$-\overset{\overset{Y}{\frown}}{C}=\overset{}{C}-$$

wherein Y represents the atoms necessary to close a phenyl nucleus,
each of $n$ and $p$ is an integer of at least 1 but so that $3 < n+p \leqslant 5$,
each of $L_2$ and $L_3$ is a methine group,
each of $R_1$ and $R_2$ represents a lower alkyl radical,
$X^-$ is an acid radical,
$r$ is an integer from 1 to 4,
$m$ is an integer from 1 to 2, and
Z represents the non-metallic atoms necessary to complete a heterocyclic nucleus selected from the group consisting of those of a thiazoline nucleus, selenazoline nucleus, naphthothiazole nucleus, thiazole nucleus, benzothiazole nucleus, oxazole nucleus, benzoxazole nucleus, naphthoxazole nucleus, selenazole nucleus, benzoselenazole nucleus, naphthoselenazole nucleus, 2-quinoline nucleus, pyridine nucleus, benzimidazole nucleus, and naphthimidazole nucleus.

2. A merocyanine dye of the following general formula:

[structure]

wherein:
A is a group selected from the group consisting of a methylene group, and the group $$-\overset{\overset{Y}{\frown}}{C}=\overset{}{C}-$$

wherein Y represents the atoms necessary to close a phenyl nucleus,
B is a methylene group,
each of $n$ and $p$ is an integer of at least 1 but so that $3 < n+p \leqslant 5$,
$R_1$ represents a lower alkyl radical,
each of $L_2$ and $L_3$ is a methine group,
$e$ is an integer from 1 to 2, and
each of P and Q is selected from the group consisting of a cyano group, a carboxyl group, an ester group, and where $$\overset{P}{\underset{Q}{\diagdown}}C=$$

represents a nucleus of the group consisting of those of the pyrazolone nucleus, isoxazolone nucleus, oxindole nucleus, 2,4,6-tri-ketohexahydropyrimidine nucleus, 2-thio-2,4-thiazolidinedione nucleus (rhodamine nucleus), 2-thio-2,4-oxazolidinedione nucleus, thianaphthenone nucleus, 2-thio-2,5-thiazolidinedione nucleus, 2,4-thiazolidinedione nucleus, thiazolidinone nucleus, 4-thiazolinone nucleus, 2-imino-4-oxazolidinone nucleus, 2,4-imidazolinedione nucleus (hydantoin nucleus, 2-thio-2,4-imidazolinedione nucleus (2-thiohydantoin nucleus), and 5-imidazolinone nucleus.

3. The dyestuff of the formula:

[structure]

4. The dyestuff of the formula:

[structure]

5. The dyestuff of formula:

[structure]

6. The dyestuff of the formula:

[structure]

7. The dyestuff of the formula:

[structure]

8. The dyestuff of the formula:

[structure]

9. The dyestuff of the formula:

[structure]

References Cited

UNITED STATES PATENTS

| | | | |
|---|---|---|---|
| 2,304,981 | 12/1942 | Wilmanns | 96—106 |
| 2,689,849 | 9/1954 | Brooker | 260—240.6 |
| 2,743,274 | 4/1956 | Brooker | 260—240.4 |
| 2,865,749 | 11/1956 | Van Allan | 96—67 |
| 2,870,014 | 1/1959 | Brooker et al. | 96—106 |
| 2,895,955 | 7/1959 | Haseltine et al. | 260—240.5 |
| 2,984,664 | 5/1961 | Fry et al. | 260—240.5 |

JOHN D. RANDOLPH, *Primary Examiner.*

N. G. TORCHIN, *Examiner.*

J. T. BROWN, *Assistant Examiner.*